US011379129B2

United States Patent
Hong et al.

(10) Patent No.: US 11,379,129 B2
(45) Date of Patent: Jul. 5, 2022

(54) FPGA-BASED INTELLIGENT STORAGE CONTROL SYSTEM AND APPLICATION THEREOF

(71) Applicant: SHANGHAI ACOUSTICS LABORATORY, CHINESE ACADEMY OF SCIENCES, Shanghai (CN)

(72) Inventors: Feng Hong, Shanghai (CN); Haihong Feng, Shanghai (CN); Minyan Huang, Shanghai (CN)

(73) Assignee: SHANGHAI ACOUSTICS LABORATORY, CHINESE ACADEMY OF SCIENCES, Shanghai (CN)

(*) Notice: Subject to any disclaimer, the term of this patent is extended or adjusted under 35 U.S.C. 154(b) by 0 days.

(21) Appl. No.: 17/133,796

(22) Filed: Dec. 24, 2020

(65) Prior Publication Data

US 2021/0117111 A1 Apr. 22, 2021

Related U.S. Application Data

(63) Continuation-in-part of application No. PCT/CN2019/086531, filed on May 13, 2019.

(30) Foreign Application Priority Data

Jan. 4, 2019 (CN) .......................... 201910007525.0

(51) Int. Cl.
*G06F 12/00* (2006.01)
*G06F 3/06* (2006.01)

(52) U.S. Cl.
CPC .......... *G06F 3/0629* (2013.01); *G06F 3/0619* (2013.01); *G06F 3/0644* (2013.01);
(Continued)

(58) Field of Classification Search
CPC .... G06F 3/0629; G06F 3/0619; G06F 3/0644; G06F 3/0658; G06F 3/0659; G06F 3/0679; G06F 3/0656; G06F 3/061; G06F 3/0631
(Continued)

(56) References Cited

U.S. PATENT DOCUMENTS

| 10,027,340 B1 | 7/2018 | Weisenberger et al. |
| 2015/0255156 A1* | 9/2015 | Chen ..................... G06F 3/0688 |
| | | 711/103 |

FOREIGN PATENT DOCUMENTS

| CN | 101446921 A | 6/2009 |
| CN | 103226976 A | 7/2013 |

(Continued)

OTHER PUBLICATIONS

Int'l Search Report for PCT/CN2019/086531, dated Oct. 9, 2019.

*Primary Examiner* — Mardochee Chery
(74) *Attorney, Agent, or Firm* — Blue Filament Law PLLC (57) ABSTRACT

A FPGA-based intelligent storage control system is provided that includes a FLASH main controller; a FLASH command former and an address generator with a memory function, for generating level signal of cross clock domain and automatically avoiding out-of-bounds writing. A configuration data former provides for driving and controlling a configuration writing in function by a writing configuration drive signal. An automatic reading configurator provides automatic configuration reading by internal drive signal to drive. A main data and auxiliary data former provides continuous storage of main data according to ping-pong operation for unequal width RAM operation. A FLASH data reading buffer and a multi-interface external drive module are also present. The system is applicable to an unmanned underwater vehicle and underwater acoustic equipment. The system and the appli-
(Continued)

cation thereof, the problems of existing storage control systems during underwater working are solved, with the characteristics of reliability, simplicity or intelligence.

8 Claims, 5 Drawing Sheets

(52) U.S. Cl.
CPC .......... *G06F 3/0658* (2013.01); *G06F 3/0659* (2013.01); *G06F 3/0679* (2013.01)

(58) Field of Classification Search
USPC ........................................................ 711/154
See application file for complete search history.

(56) References Cited

FOREIGN PATENT DOCUMENTS

| | | |
|---|---|---|
| CN | 103399831 A | 11/2013 |
| CN | 108255433 A | 7/2018 |
| CN | 109683829 A | 4/2019 |

\* cited by examiner

FPGA-BASED INTELLIGENT STORAGE CONTROL SYSTEM AND APPLICATION THEREOF

CROSS-REFERENCE TO RELATED APPLICATION

This application is a continuation in part of Patent Cooperation Treaty Application Serial Number PCT/CN2019/086531 filed May 13, 2019 (commonly referred to as a "bypass" application) that in turn claims priority of Chinese Invention Patent Application No. 201910007525.0 filed Jan. 4, 2019, the contents of which are incorporated herein by reference.

FIELD OF TECHNOLOGY

The present invention relates to the field of intelligent storage, in particular to the field of FLASH storage, specifically, it refers to a FPGA-based intelligent storage control system and application thereof.

DESCRIPTION OF RELATED ARTS

The design of intelligent storage control system is a key technology in the design of unmanned underwater vehicles and underwater acoustic equipment, and has a very important application value. In applications involving underwater sailing, underwater positioning and navigation, and communication and underwater detection, especially in applications such as underwater acoustic positioning and navigation, and communication, it is often necessary to use a flash memory FLASH to store a large number of different types of data, and to deal with various complex situations. Therefore, it is often necessary to mount a storage system. In addition, in view that the unmanned underwater vehicle and underwater acoustic equipment is equipped with many different types of sonar and internal and external sensors, the study on the design of an intelligent storage control system based on FPGA (Field Programmable Gate Array) is also necessary. The intelligent storage control system can realize efficient storage and reduce manual input, which is of great significance.

At present, in view of the existing storage control system design for commonly used unmanned underwater vehicles and underwater acoustic equipment, the concept of division into three special areas and the mechanism for autonomously allocating storage space are not realized; an autonomous memory update function and an automatic configuration function are not provided when dealing with system restart and shutdown problems caused by a complex underwater environment; and finally, in the storage and writing control, the user is usually required to control input parameters, resulting in a lot of inconveniences. Therefore, regardless of from the perspective of reliability, simplicity or intelligence, the storage control system design for general unmanned underwater vehicles and underwater acoustic equipment is not good in performance.

SUMMARY OF THE INVENTION

The object of the present invention is to overcome the drawbacks of the above prior arts, provides a reliability, simplicity and intelligence FPGA-based intelligent storage control system and application thereof.

In order to achieve the above objects, the present invention of FPGA-based intelligent storage control system and application thereof has the follows:

the FPGA-based intelligent storage control system, characterized in that, the said system comprises:

FLASH main controller, for processing the physical layer of FLASH reading, writing in and erasing, and generating various flag bit;

FLASH command former and address generator with memory function, connected with the FLASH main controller, for generating level signal of cross clock domain, automatically generating each partition writing address according to the current storage space allocation, and automatically avoiding out-of-bounds writing in;

configuration data former, connected with the FLASH main controller, for driving and controlling configuration writing function by writing in configuration drive signal;

automatic read configurator, connected with the FLASH main controller, for realizing automatic configuration reading by internal drive signal to drive;

main data and auxiliary data former, connected with the FLASH main controller, for realizing continuous storage of main data according to ping-pong operation for unequal width RAM operation;

FLASH data read buffer, connected with the FLASH main controller, for buffering FLASH data;

multi-interface external drive module, connected with the FLASH main controller and FLASH data read buffer, for autonomously recording the number of sent packets and completing a given amount of work.

Preferably, the said system further comprises a data storage area, the data storage area comprises:

configuration data storage area, connected with the FLASH main controller, for storing system configuration information and system-related configuration data information;

auxiliary data storage area, connected with the FLASH main controller, for storing auxiliary data information of sonar, internal and external sensors;

main data storage area, connected with the FLASH main controller, for storing digital signal data collected by digital sampler.

Preferably, the data storage area automatically allocates storage space according to device parameters.

Preferably, the data stored in the configuration data storage area comprises frame header, end address of the auxiliary data storage area recorded at last time, end address of the main data storage area recorded at last time, operating mode, synchronization operating point, latitude and longitude information of each latent standard, preset-set sound velocity vector information, detection threshold and latent standard routing information.

Preferably, the data stored in the auxiliary data storage area comprises frame header, packet number, current recording time stamp, calculation data of multiple collision avoidance sonars, underwater positioning time, underwater positioning result, underwater unmanned vehicle to deck unit communication load data, deck unit to underwater unmanned vehicle communication load data, underwater unmanned vehicle attitude data, doppler velocity logger speed data, inertial navigation position data, underwater unmanned vehicle positioning analysis data and frame tail data.

Preferably, the main data storage area comprises frame header, recording time and digital signal collected by AD sampler.

Preferably, the flag bits generated by the FLASH main controller comprise a reading flag, a writing in flag, an erasing completion flag and a busy flag.

Preferably, the FLASH command former and address generator with memory function comprises:

FLASH command former, connected with the FLASH main controller, for transforming electric frequency signal and edge signal according to the acquired command and the conditions of the existing unmanned underwater vehicle and underwater acoustic equipment;

intelligent storage control system, connected with the FLASH main controller, for automatically generating the writing in address of each partition according to the current storage area allocation;

address generator, connected with the FLASH main controller, for automatically avoiding out-of-bounds writing in according to the size of the current storage area.

Preferably, the configuration data former comprises main state machine and deputy state machine, both of which are connected with the FLASH main controller, and the main state machine and the deputy state machine are connected to each other, for driving and controlling the configuration writing in function by writing in configuration drive signal.

Preferably, the internal drive signal of automatic reading configurator is an edge triggering signal generated based on power-on reset signal.

Preferably, the main data and auxiliary data former comprises FLASH control state machine, connected with FLASH main controller and multi-interface external drive module, for receiving main data and auxiliary data and then generating arbitration and reading them sequentially, outputting data to the multi-interface external drive module.

Application of the above-mentioned the FPGA-based intelligent storage control system in an unmanned underwater vehicle and underwater acoustic equipment.

The FPGA-based intelligent storage control system and application thereof of the present invention are adopted such that the mechanism of autonomously allocating the storage space is realized; an autonomous memory update function and an automatic configuration function are provided when dealing with system restart and shutdown problems caused by a complex underwater environment; in the storage and writing in control, many inconveniences caused by the need for the user to control input parameters are avoided; and the problems of the existing storage control systems when working under water can be solved, has the characteristics of reliability, simplicity or intelligence. The intelligent storage control system can realize efficient storage and reduce manual input, which is of great significance.

DETAILED DESCRIPTION OF THE PREFERRED EMBODIMENT

In order to be able to understand the technical content of the present invention more clearly, is further exemplified by the following detailed description of embodiments.

The FPGA-based intelligent storage control system of the present invention, wherein the system comprises:

FLASH main controller, for processing the physical layer of FLASH reading, writing in and erasing, and generating various flag bit;

FLASH command former and address generator with memory function, connected with the FLASH main controller, for generating level signal of cross clock domain, automatically generating each partition writing address according to the current storage space allocation, and automatically avoiding out-of-bounds writing in;

configuration data former, connected with the FLASH main controller, for driving and controlling configuration writing function by writing in configuration drive signal;

automatic read configurator, connected with the FLASH main controller, for realizing automatic configuration reading by internal drive signal to drive;

main data and auxiliary data former, connected with the FLASH main controller, for realizing continuous storage of main data according to ping-pong operation for unequal width RAM operation;

FLASH data read buffer, connected with the FLASH main controller, for buffering FLASH data;

multi-interface external drive module, connected with the FLASH main controller and FLASH data read buffer, for autonomously recording the number of sent packets and completing a given amount of work.

As a preferred embodiment of the present invention, the said system further comprises a data storage area, the data storage area comprises:

configuration data storage area, connected with the FLASH main controller, for storing system configuration information and system-related configuration data information;

auxiliary data storage area, connected with the FLASH main controller, for storing auxiliary data information of sonar, internal and external sensors;

main data storage area, connected with the FLASH main controller, for storing digital signal data collected by digital sampler.

As a preferred embodiment of the present invention, the data storage area automatically allocates storage space according to device parameters.

As a preferred embodiment of the present invention, the data stored in the configuration data storage area comprises frame header, end address of the auxiliary data storage area recorded at last time, end address of the main data storage area recorded at last time, operating mode, synchronization operating point, latitude and longitude information of each latent standard, preset-set sound velocity vector information, detection threshold and latent standard routing information.

As a preferred embodiment of the present invention, the data stored in the auxiliary data storage area comprises frame header, packet number, current recording time stamp, calculation data of multiple collision avoidance sonars, underwater positioning time, underwater positioning result, underwater unmanned vehicle to deck unit communication load data, deck unit to underwater unmanned vehicle communication load data, underwater unmanned vehicle attitude data, doppler velocity logger speed data, inertial navigation position data, underwater unmanned vehicle positioning analysis data and frame tail data.

As a preferred embodiment of the present invention, the main data storage area comprises frame header, recording time and digital signal collected by AD sampler.

As a preferred embodiment of the present invention, the flag bits generated by the FLASH main controller comprise a reading flag, a writing in flag, an erasing completion flag and a busy flag.

As a preferred embodiment of the present invention, the FLASH command former and address generator with memory function comprises:

FLASH command former, connected with the FLASH main controller, for transforming electric frequency signal and edge signal according to the acquired command and the conditions of the existing unmanned underwater vehicle and underwater acoustic equipment;

intelligent storage control system, connected with the FLASH main controller, for automatically generating the writing in address of each partition according to the current storage area allocation;

address generator, connected with the FLASH main controller, for automatically avoiding out-of-bounds writing in according to the size of the current storage area.

As a preferred embodiment of the present invention, the configuration data former comprises main state machine and deputy state machine, both of which are connected with the FLASH main controller, and the main state machine and the deputy state machine are connected to each other, for driving and controlling the configuration writing in function by writing in configuration drive signal.

As a preferred embodiment of the present invention, the internal drive signal of automatic reading configurator is an edge triggering signal generated based on power-on reset signal.

As a preferred embodiment of the present invention, the main data and auxiliary data former comprises FLASH control state machine, connected with FLASH main controller and multi-interface external drive module, for receiving main data and auxiliary data and then generating arbitration and reading them sequentially, outputting data to the multi-interface external drive module.

The present invention also relates to the application of the above-mentioned the FPGA-based intelligent storage control system in an unmanned underwater vehicle and underwater acoustic equipment.

In specific embodiments of the present invention, a storage system is divided into three storage areas, namely a configuration data storage area, an auxiliary data storage area, and a main data storage area, and a storage space is automatically allocated based on parameters of an unmanned underwater vehicle and underwater acoustic equipment. A frame of an intelligent storage control system for the unmanned underwater vehicle and underwater acoustic equipment is generated based on FPGA. A FLASH command former and an address generator with a memory function are generated based on FPGA. A main state machine and a deputy state machine are configured to control a configuration writing function, and automatically read configuration data based on a configuration reading state machine. A cross-clock-domain main data and auxiliary data former is generated based on ping-pong operation. A multi-interface external drive module with an independent decision function is generated. The present invention can effectively solve the problems in terms of reliability, simplicity or intelligence of the existing storage control systems applied to unmanned underwater vehicles and underwater acoustic equipment when working underwater.

The system comprises: storage system is divided into three storage areas, namely the configuration data storage area, the auxiliary data storage area and the main data storage area.

The storage space is automatically allocated based on system parameters of the unmanned underwater vehicle and underwater acoustic equipment.

The FLASH command former and the address generator with the memory function are generated based on FPGA.

The main state machine and the deputy state machine control a configuration writing in function, and automatically read the configuration data based on the configuration reading state machine.

The main data and auxiliary data former of cross clock domain is generated based on ping-pong operation.

The multi-interface external drive module has an independent decision function.

The storage system is divided into three storage areas, namely the configuration data storage area, the auxiliary data storage area and the main data storage area.

The configuration data area storage area is mainly configured to store system configuration information and system-related configuration data information, including an end address of the auxiliary data storage area recorded at last time, an end address of the main data storage area recorded at last time, and the like.

The auxiliary data storage area is mainly configured to store related information of sonar, internal and external sensors.

The main data storage area is mainly configured to store a digital signal with a time flag collected by a digital sampler (AD).

The storage space is automatically allocated based on parameters of the unmanned underwater vehicle and underwater acoustic equipment:

the storage area is automatically allocated, specifically, the configuration data area is stored in a head area or a tail area of the storage system;

the storage area of the auxiliary data and the main data depends on system parameters, and the storage space is automatically allocated.

The FLASH command former and the address generator with a memory function are generated based on FPGA, which specifically includes:

the FLASH command former integrates commands obtained from multiple interfaces with timing, environment and other conditions of the existing unmanned underwater vehicle and underwater acoustic equipment, and then generates a level signal of cross clock domain that is converted from an edge signal, or converts a level signal into an edge signal of cross clock domain; and the intelligent storage control system automatically generates the writing in address of each partition according to the current storage area allocation. Even if there is a power failure, it can still be automatically loaded according to the configuration data stored in the configuration data area and written in according to existing rules. The existing rules comprise, but are not limited to, incremental writing, decrement writing, interval write, etc.

The address generator can automatically avoid out-of-bounds writing according to the size of the current storage area.

The address generator has the ability to automatically release space in situations such as erasing, and a state machine of the address generator automatically resets the original state without any human intervention.

The main state machine and the deputy state machine control a configuration writing in function, and automatically read the configuration data based on a configuration reading state machine, which specifically includes:

the configuration writing in state machine is composed of a main state machine and an auxiliary state machine, both of which are driven by writing in a configuration drive signal. The drive signal is composed of several parts, including, but not limited to, an operation stopping and edge triggering signal, a multi-interface writing configuration data enable signal, an automatic writing configuration enable signal after erasing, and the like. After the drive signal is acquired, the main state machine and the deputy state machine enter a state of writing in configuration data. Among then, the main state machine is composed of two stages, namely head area erase and configuration writing in.

The main state machine first completes the erasing of the head area, then completes state clearing after the single block erase is completed and the operation type is determined as "writing in configuration", and waits for the configuration data executed by the deputy state machine to be written in RAM and outputs a data ready flag signal. Next, the writing in configuration is continued to be completed, and a writing configuration completion signal is feed back to an upper computer through a plurality of interfaces.

The automatic configuration reading state machine is driven by an internal drive signal, rather than an external drive signal, thereby realizing automatic configuration reading. The internal drive signal is based on an edge triggering signal generated by each power-on reset signal.

The main data and auxiliary data former of cross clock domain is generated based on ping-pong operation, which specifically includes:

the continuous storage of the main data is realized by using the ping-pong operation to operate unequal width RAM, that is, the FLASH control state machine realizes the reading of RAMB in the case of writing to the RAMA; the reading to RAMA is realized in the case of writing to RAMB; and the reading and writing of double unequal width RAM are alternately completed;

in the case of writing in the main data, if any unequal width RAM is full in writing, a data ready signal is generated and sent to a FLASH control state machine through a data selector, and then a reading command and an address are reversed to the corresponding RAM; in the case of writing in auxiliary data, a data ready signal is generated also under the control of the state machine after a page is filled; and the FLASH control state machine generates arbitration after receiving the main data and auxiliary data, and reads them sequentially. In addition, writing in and reading signals of RAM are maintained by a delayer to complete the cross clock domain processing, thereby ensuring that metastability is avoided.

The multi-interface external drive module has an independent decision function, which specifically includes:

the drive module is controlled by a direct memory access (DMA) to autonomously load the contents in non-empty FIFO to the RAM after acquiring the FIFO; the content is then output to the multi-interface external drive module through the FLASH control state machine; and the multi-interface external drive module has an independent decision function, and is configured to record the number of sent packets and independently ends after completing the set number of packets without any external commands, and meanwhile, a FLASH controller and a FLASH data reading buffer are forced to end.

Figure 1:
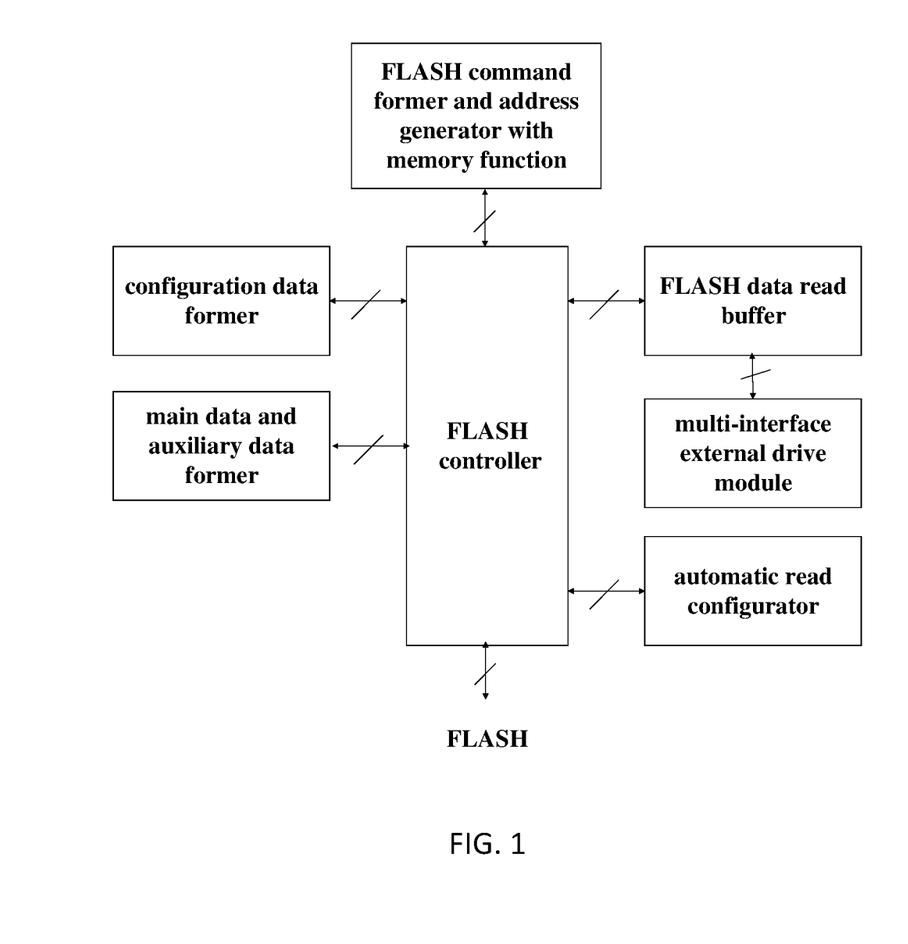
FIG. 1 is a schematic diagram of a framework of an FPGA-based intelligent storage control system according to the present invention.
Figure 2:
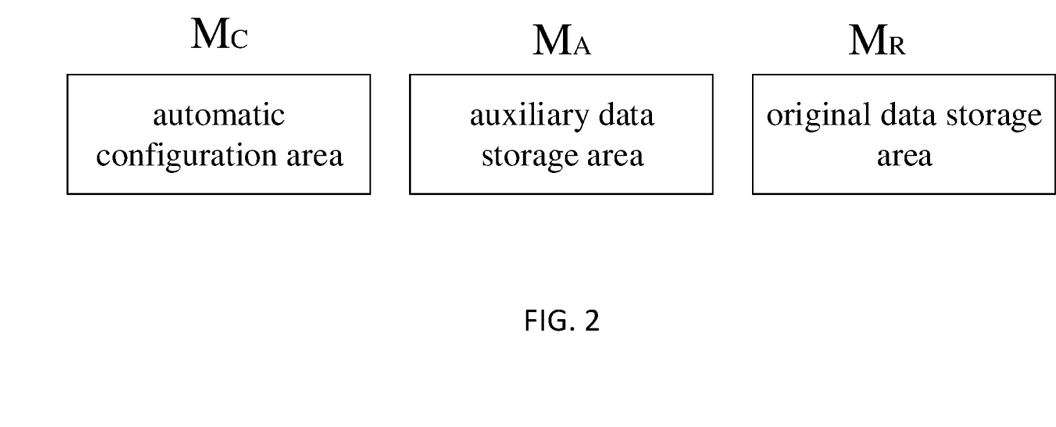
FIG. 2 is a schematic diagram of three types of data storage areas of the FPGA-based intelligent storage control system according to the present invention.
Figure 5:
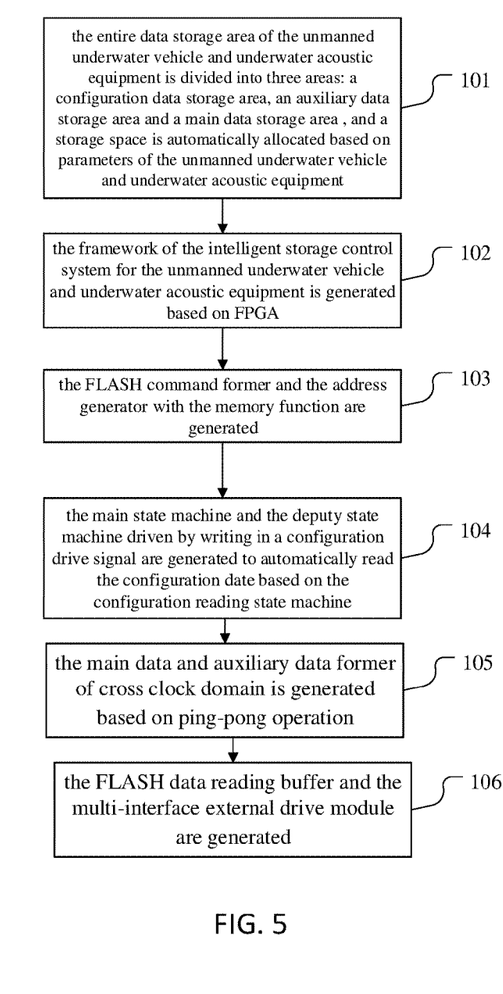
FIG. 5 is a flowchart of a system generation method for implementing the FPGA-based intelligent storage control system according to the present invention.

The present invention will be further described in detail below with reference to the drawings and embodiments. FIG. 5 is a schematic flowchart of the implementation process of an FPGA-based intelligent storage control system design method applied to the unmanned underwater vehicle and underwater acoustic equipment according to an embodiment of the present invention, as shown in FIG. 5, the FPGA-based intelligent storage control system design method applied to the unmanned underwater vehicle and underwater acoustic equipment provided by this embodiment comprises the following steps:

In step 101, the entire data storage area of the unmanned underwater vehicle and underwater acoustic equipment is divided into three areas: a configuration data storage area, an auxiliary data storage area and a main data storage area (as shown in FIG. 2), and a storage space is automatically allocated based on parameters of the unmanned underwater vehicle and underwater acoustic equipment.

The contents stored in the configuration data area shall mainly include but not limited to: frame header, end address of the auxiliary data storage area recorded at last time, end address of the main data storage area recorded at last time, operating mode, synchronization operating point, latitude and longitude information of each latent standard, preset sound velocity vector information, detection threshold and latent standard routing information.

Each time the auxiliary data is recorded is called a frame, the contents of the auxiliary data record mainly include but are not limited to: frame header, packet number, current recording time stamp, calculation data of multiple collision avoidance sonars, underwater positioning time, underwater positioning result, underwater unmanned vehicle (UUV) to deck unit communication load data, deck unit to UUV communication load data, UUV attitude data, doppler velocity logger (DVL) speed data, inertial navigation position data, UUV positioning analysis data and frame tail data.

The main contents of the main data record includes but are not limited to: frame header, recording time and digital signal collected by the AD sampler.

The storage area is automatically allocated, specifically, the configuration data area is stored in a head area or a tail area of the storage system in N consecutive blocks, of which the storage size is fixed to 512K×N bytes;

Assuming that a recording frequency of the auxiliary data is $f_A$, and the storage size of a frame recorded each time is $N_{APER}$, the storage space recorded per second is $N_A = f_A N_{APER}$ bytes;

assuming that a sampling frequency of the main data is $f_s$, and its storage bit width is $N_W$, the storage space recorded per second is $N_M = f_s N_W$ bytes.

Therefore, assuming that the total capacity is T bytes, when the storage space is allocated, the space allocated for the auxiliary data area should be:

$$T_A = \frac{(T-1)N_A}{N_A + N_M} = \frac{(T-1)f_A N_{APER}}{f_A N_{APER} + f_s N_W} \quad (1)$$

and the corresponding space allocated for the main data area is:

$$T_M = \frac{(T-1)N_M}{N_A + N_M} = \frac{(T-1)f_s N_W}{f_A N_{APER} + f_s N_W} \quad (2)$$

The above units are all bytes.

In step 102, the framework of the intelligent storage control system for the unmanned underwater vehicle and underwater acoustic equipment is generated based on FPGA.

Figure 3:
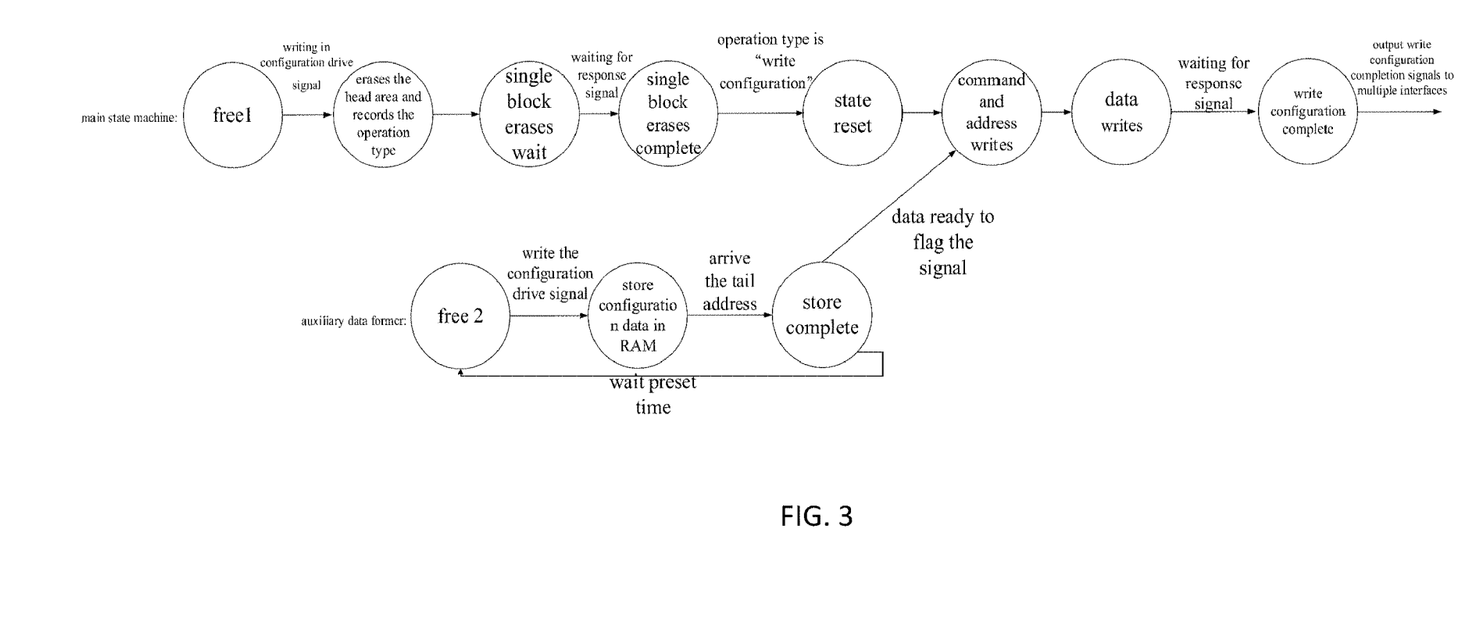
FIG. 3 is a schematic diagram of a main state machine and a deputy state machine for configuration writing of the FPGA-based intelligent storage control system according to the present invention.

The framework includes the following basic component units: a FLASH main controller, a FLASH command former, an address generator with a memory function, a configuration data former, an automatic reading configurator, a main data and auxiliary data former, a FLASH data reading buffer and other control units, as shown in FIG. 3. The basic component units are controlled by a finite state machine, respectively.

The FLASH main controller is configured to process the physical layer of FLASH reading, writing in and erasing, and generate various flag bits. The flag bits include, but are not limited to, a reading flag, a writing in flag, an erasing completion flag and a busy flag.

In step 103, the FLASH command former and the address generator with the memory function are generated.

The FLASH command former integrates commands obtained from multiple interfaces with timing, environment and other conditions of the existing unmanned underwater vehicle and underwater acoustic equipment, and then generates a level signal of cross clock domain that is converted from an edge signal, or converts a level signal into an edge signal of cross clock domain.

In addition, the intelligent storage control system automatically generates the writing in address of each partition according to the current storage area allocation. Even if there is a power failure, it can still be automatically loaded according to the configuration data stored in the configuration data area and written in according to existing rules. The existing rules include, but are not limited to, incremental writing, decrement writing, interval write, etc.

The address generator can automatically avoid out-of-bounds writing in according to the size of the current storage area.

The address generator has the ability to automatically release space in situations such as erasing, and the state machine of the address generator automatically resets the original state without any human intervention.

In step 104, the main state machine and the deputy state machine driven by writing in a configuration drive signal are generated to automatically read the configuration date based on the configuration reading state machine.

As shown in FIG. 3, the configuration writing in state machine is composed of a main state machine and a deputy state machine, both of which are driven by writing in a configuration drive signal. The drive signal is composed of several parts, including, but not limited to, an operation stopping and edge triggering signal, a multi-interface (Ethernet, serial port, synchronous serial ports (Synchronous serial PORTs, SPORT) etc.) writing configuration data enable signal, an automatic writing configuration enable signal after erasing, and the like. After the drive signal is acquired, the main state machine and the deputy state machine enter a state of writing in configuration data. The main state machine is composed of two stages, namely head area erase and configuration writing in.

The main state machine first completes the erasing of the head area, then completes state clearing after the single block erase is completed and the operation type is determined as "writing in configuration", and waits for the configuration data executed by the deputy state machine to be write-up RAM and outputs a data ready flag signal. Next, the writing in configuration is continued to be completed, and a writing configuration completion signal is feed back to an upper computer through a plurality of interfaces.

An automatic configuration reading state machine is driven by an internal drive signal, rather than an external drive signal, thereby realizing automatic configuration reading. The internal drive signal is based on an edge triggering signal generated by each power-on reset signal.

In step 105, the main data and auxiliary data former of cross clock domain is generated based on ping-pong operation.

Figure 4:
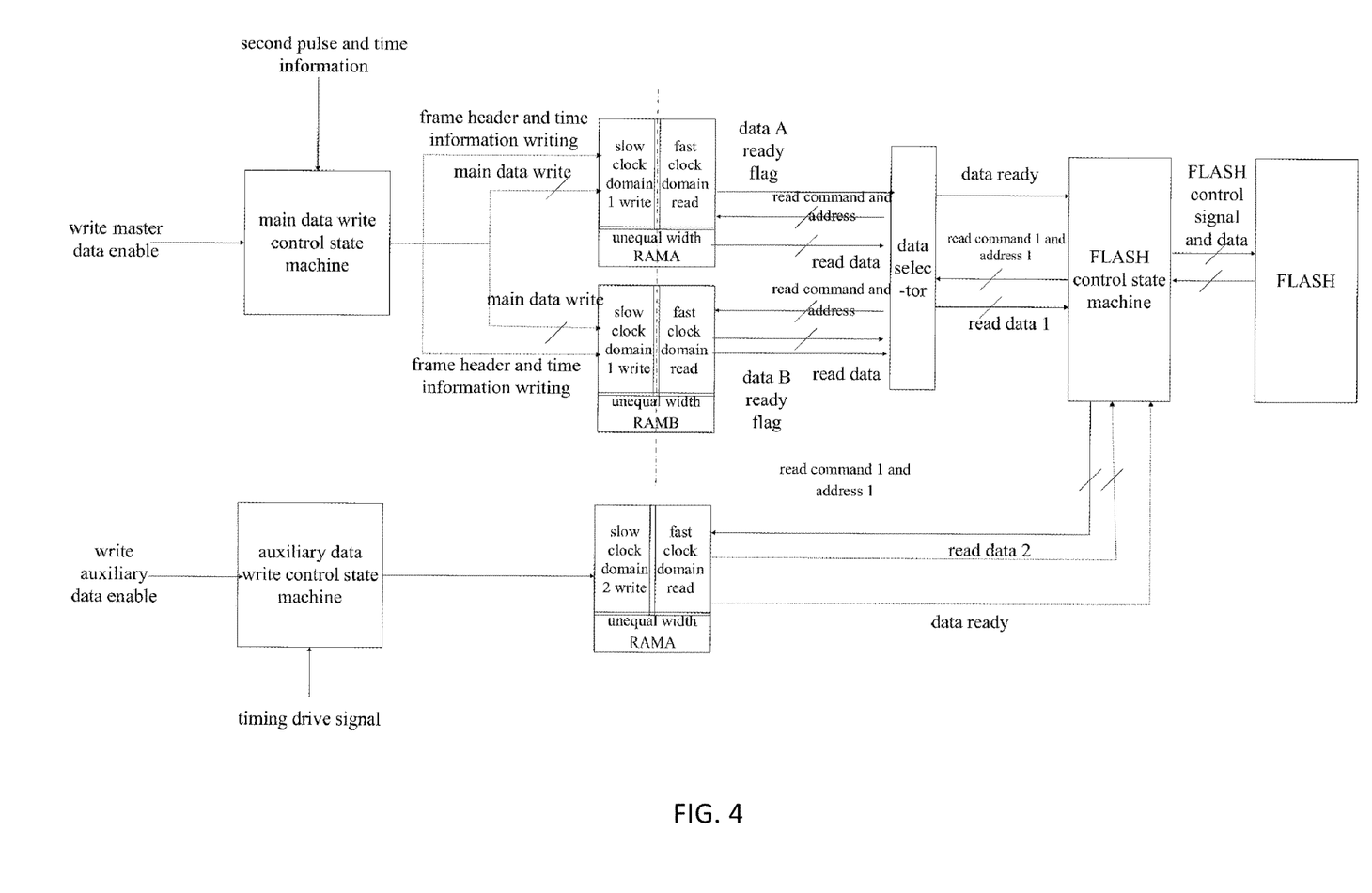
FIG. 4 is a schematic diagram of a main data former and auxiliary data former of the FPGA-based intelligent storage control system according to the present invention.

As shown in FIG. 4, the continuous storage of the main data is realized by using the ping-pong operation to operate unequal width RAM, that is, the FLASH control state machine realizes the reading of RAMB in the case of writing in to the RAMA; the reading to RAMA is realized in the case of writing in to RAMB.

In the case of writing in the main data, if any unequal width RAM is full in writing, a data ready signal is generated and sent to the FLASH control state machine through a data selector, and then a read command and an address are reversed to the corresponding RAM; in the case of writing in auxiliary data, a data ready signal is generated also under the control of the state machine after a page is filled.

The FLASH control state machine generates arbitration after receiving the main data and auxiliary data, and reads them sequentially. In addition, writing in and reading signals of RAM are maintained by a delayer to complete cross-clock-domain processing, thereby ensuring that metastability is avoided.

In step 106, the FLASH data reading buffer and the multi-interface external drive module are generated.

The drive module is controlled by a direct memory access (DMA) to autonomously load the contents in non-empty FIFO to the RAM after acquiring the FIFO. The content is output to the multi-interface external drive module through the FLASH control state machine.

The multi-interface external drive module has an independent decision function, and is configured to record the number of sent packets and independently ends after completing the set number of packets without any external commands, and meanwhile, a FLASH controller and a FLASH data reading buffer are forced to end.

The FPGA-based intelligent storage control system of the present invention is adopted such that the mechanism of autonomously allocating the storage space is realized; an autonomous memory update function and an automatic configuration function are provided when dealing with system restart and shutdown problems caused by a complex underwater environment; in the storage and writing in control, many inconveniences caused by the need for the user to control the input parameters are avoided; and the problems of the existing storage control systems when working under water can be solved, has the characteristics of reliability, simplicity or intelligence. The intelligent storage control system can realize efficient storage and reduce manual input, which is of great significance.

In this specification, the present invention has been described with the reference to its specific embodiments. However, it is obvious still may be made without departing from the spirit and scope of the present invention, various modifications and transformation. Accordingly, the specification and drawings should be considered as illustrative rather than restrictive.

The invention claimed is:

1. A FPGA-based intelligent storage control system, the system comprising:

a FLASH main controller, for processing a physical layer of FLASH reading, writing in and erasing, and generating various flag bits;
a data storage area, the data storage area comprising:
a configuration data storage area, connected with the FLASH main controller, for storing system configuration information and system-related configuration data information;
an auxiliary data storage area, connected with the FLASH main controller, for storing auxiliary data information of sonar, internal and external sensors; and
a main data storage area, connected with the FLASH main controller, for storing digital signal data collected by digital sampler;
where the data storage area automatically allocates storage space according to device parameters;
said system further comprises:
a FLASH command former and address generator with memory function, connected with the FLASH main controller, for generating a level signal of cross clock domain, automatically generating each partition writing address according to a current storage space allocation, and automatically avoiding out-of-bounds writing in;
a configuration data former, connected with the FLASH main controller, for driving and controlling configuration writing function by writing in a configuration drive signal;
an automatic read configurator, connected with the FLASH main controller, for realizing automatic configuration reading by an internal drive signal to drive;
a main data and auxiliary data former, connected with the FLASH main controller, for realizing continuous storage of main data according to ping-pong operation for unequal width RAM operation;
a FLASH data read buffer, connected with the FLASH main controller, for buffering FLASH data;
a multi-interface external drive module, connected with the FLASH main controller and FLASH data read buffer, for autonomously recording a number of sent packets and completing a given amount of work;
where the FLASH command former and address generator with memory function comprises:
the FLASH command former, connected with the FLASH main controller, for transforming electric frequency signal and edge signal according to an acquired command and conditions of an existing unmanned underwater vehicle and underwater acoustic equipment;
an intelligent storage control system, connected with the FLASH main controller, for automatically generating writing in an address of each partition according to a current storage area allocation;
an address generator, connected with the FLASH main controller, for automatically avoiding out-of-bounds writing in according to a size of the current storage area allocation; and
where the configuration data former comprises a main state machine and a deputy state machine, both of which are connected with the FLASH main controller, and the main state machine and the deputy state machine are connected to each other, for driving and controlling the configuration writing in function by writing in configuration drive signal.

2. The FPGA-based intelligent storage control system according to claim 1, wherein the data stored in the configuration data storage area comprises a frame header, end address of the auxiliary data storage area recorded at last time, end address of the main data storage area recorded at last time, operating mode, synchronization operating point, latitude and longitude information of each latent standard, preset-set sound velocity vector information, detection threshold and latent standard routing information.

3. The FPGA-based intelligent storage control system according to claim 1, wherein the data stored in the auxiliary data storage area comprises a frame header, a packet number, a current recording time stamp, a set of calculation data of multiple collision avoidance sonars, an underwater positioning time, an underwater positioning result, a set of underwater unmanned vehicle to deck unit communication load data, a set of deck unit to underwater unmanned vehicle communication load data, a set of underwater unmanned vehicle attitude data, a set of doppler velocity logger speed data, a set of inertial navigation position data, and a set of underwater unmanned vehicle positioning analysis data and frame tail data.

4. The FPGA-based intelligent storage control system according to claim 1, wherein the main data storage area comprises a frame header, a recording time, and a digital signal collected by an AD sampler.

5. The FPGA-based intelligent storage control system according to claim 1, wherein the flag bits generated by the FLASH main controller comprise a reading flag, a writing in flag, an erasing completion flag, and a busy flag.

6. The FPGA-based intelligent storage control system according to claim 1, wherein the internal drive signal of the automatic reading configurator is an edge triggering signal generated based on power-on reset signal.

7. The FPGA-based intelligent storage control system according to claim 1, wherein the main data and auxiliary data former comprises a FLASH control state machine, connected with the FLASH main controller and the multi-interface external drive module, for receiving main data and auxiliary data and then generating arbitration and reading them sequentially, outputting data to the multi-interface external drive module.

8. An application of the FPGA-based intelligent storage control system according to claim 1, in an unmanned underwater vehicle and underwater acoustic equipment.

* * * * *